M. LANDRIN.
TRACTION WHEEL.
APPLICATION FILED APR. 6, 1915.
1,260,213.
Patented Mar. 19, 1918.
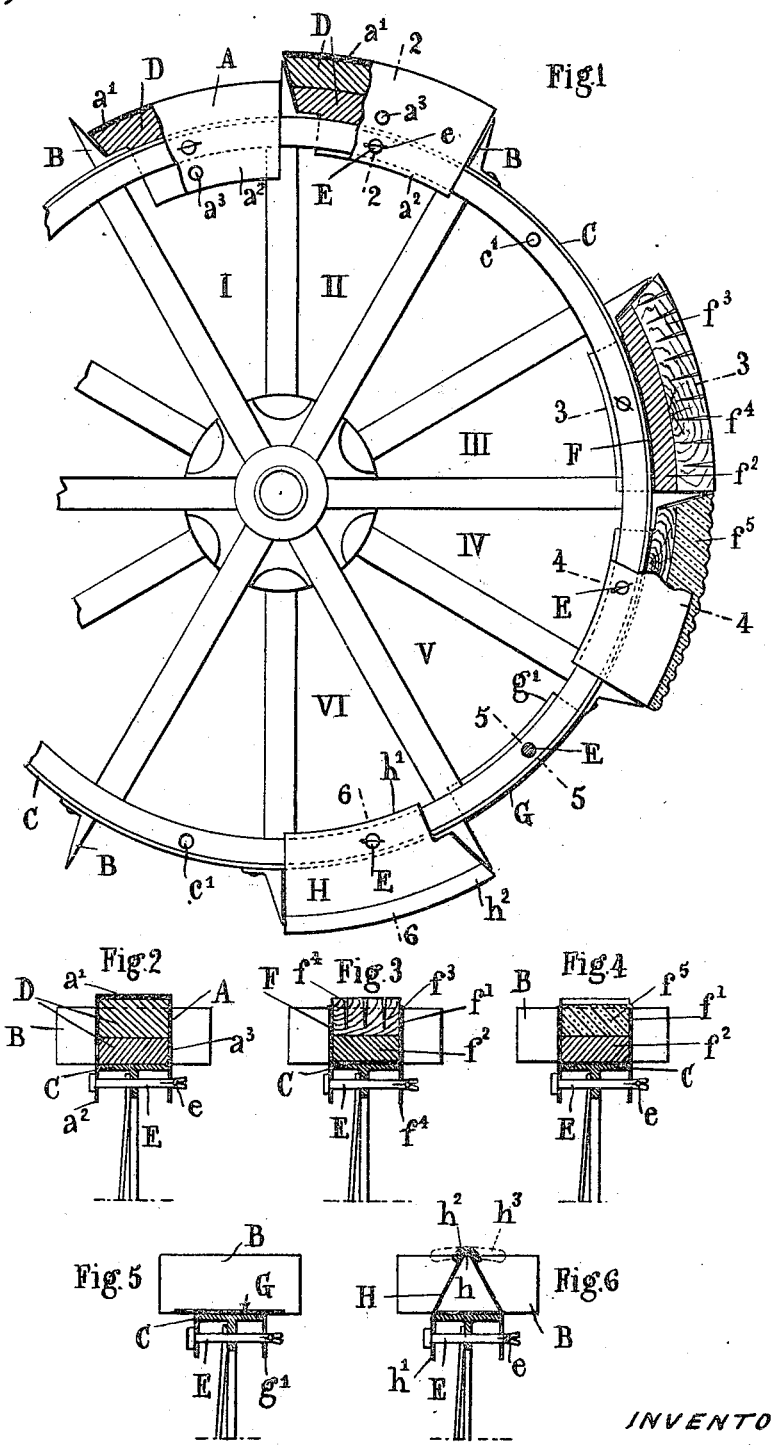
INVENTOR
MARCEL LANDRIN,
By Hinson and Hinson
his Attorneys.

UNITED STATES PATENT OFFICE.

MARCEL LANDRIN, OF SOISSONS, FRANCE.

TRACTION-WHEEL.

1,260,213.

Specification of Letters Patent. Patented Mar. 19, 1918.

Application filed April 6, 1915. Serial No. 19,619.

*To all whom it may concern:*

Be it known that I, MARCEL LANDRIN, a citizen of the Republic of France, and a resident of Soissons, Department of Aisne, France, (whose postal address is temporarily Escadrille V. B. 5 Secteur Postal No. 15, France,) have invented new and useful Traction-Wheels, of which the following is a specification.

The present invention relates to agricultural tractors, road tractors, and similar tractors fitted with wheels of large diameter and narrow rims. Upon the rim are bolted transverse angle-irons forming blades wider than the rim. According to the nature of the ground upon which the tractor is traveling and according to the degree of adhesion to be obtained upon a predetermined soil, it may be advantageous to lessen the surface in use of the blades or to increase the surface in use of the rim. The present invention has for object an arrangement which enables this result to be obtained by the interposition or addition of detachable fittings between the blades of the wheel.

The annexed drawing shows, by way of example, various forms of carrying out the present invention.

Figure 1 is a view in elevation of a tractor wheel furnished with different types of fittings, partly in section.

Figs. 2, 3, 4, 5 and 6 are sections on lines 2—2, 3—3, 4—4, 5—5 and 6—6 of Fig. 1.

The first type of fitting (Fig. 1, segments I and II and Fig. 2) consists of a metal fitting A of U-shape of which the bottom $a'$ has the curve of the circumference of the wheel at the level of the extremities of the blades B and of which the wings or side flanges $a^2$ are of a width apart equal to the width of the rim C of the wheel. The fittings A are intended to cap or cover or fill up the rim C in the space between two blades B, after wooden packing pieces or blocks D have been interposed between the periphery of the rim and the bottom $a'$ of the fitting.

The number of packing-pieces or blocks D thus interposed may vary according to the extent to which it is desired the blades B shall project. The upper part of Fig. 1 shows two segments of the wheel, of which one (segment I) is furnished with the fitting A having a single packing piece D and of which the other (segment II) is furnished with the fitting A which has two packing pieces D. The fittings A are rendered fast in their mounted position by means of gudgeons or pins E passing through perforations $a^3$ in the wings of the fitting, and through perforations $c'$ in the rim. There are in each wing of the fitting A as many perforations $a^3$ as there are layers of packing-pieces or blocks D.

The second type of fitting (Fig. 1, segment III and Fig. 3) consists of a metallic piece or holder F in the shape of a double T or H of which the cross bar is fitted against this rim. Between the external wings or flanges $f'$ of the piece F is fixed a wooden block or packing piece $f^2$ upon which is screwed by means of screw devices or other fastenings a tire $f^3$ slightly projecting above or beyond the extremities of the wings $f'$. The tire $f^3$ may be furnished with nails $f^4$ which retard wear and increase adhesion. When the tire $f^3$ is worn flush with the extremities of the wings $f'$ there may be interposed between it and the fixed block $f^2$ an auxiliary block intended to afford the necessary supplementary thickness. This arrangement enables the tire $f^3$ to be utilized until completely worn out. The inner ends of the wings or flanges $f^4$ serve to fix the fitting upon the rim by means of pins E as in the present example.

Fig. 1 (segment IV) and Fig. 4 show a modification which only differs from the foregoing in that the wooden tire $f^3$ is replaced by a strip or similar rubber tire $f^5$.

If it be wished to increase the surface of the rim in use without lessening the surface in use of the blade, there may be employed the type of fitting shown in Fig. 1 (segment V) and Fig. 5. This fitting consists of a wide metal plate G curved or arched to the periphery of the rim and fitted with two wings or side flanges $g'$ which serve for the fixing of the fitting in place by means of the pin E.

Fig. 1 (segment VI) and Fig. 6 show a fitting H which is of triangular section having its base bearing upon the periphery of the rim C and of which the opposite apex $h$ slightly passes beyond the extremities of the blades B. The fitting H is furnished with wings or flanges $h'$ which serve for its fixation by means of gudgeons or pins E. The apex $h$ of the fitting serves as the tread for hard ground. On soft soil the triangular shape of the fitting is favorable to the penetration of the wheel into the soil and automatically causes the adherence of the tractor to be proportionate to the resistance to be overcome. Upon the apex of the fitting is preferably mounted a protective tire $h^2$ furnished with grousers or blades $h^3$ (shown in dot and dash lines in Fig. 6). This tire is removable and allows wear of the main fitting H to be avoided.

The fixation pins E are preferably split or cleft with a saw-cut long enough to extend into the parts to be held. In this saw cut and near the extremity of the pin or gudgeon is formed a hole in which can be inserted a small peg $e$ of slightly truncated cone shape. The pin being put in place, the peg is driven into its seat by a hammer. The ends of the pin E thereupon slightly open out when they pass through the part to be held, and this causes a forcible wedging of the pin or gudgeon. The peg $e$ is fitted transversely with spurs or rough parts which prevent it from being disengaged at an untimely moment.

The invention is not limited to the details of carrying out the same which have been described above, and it can be put into practice with various modifications based on the same principle. Thus, for example, the wooden blocks or packing pieces D or $f^2$ may be replaced by elastic members such as undulated springs, coiled springs or the like. In this case, the fitting must be mounted in such a way as to be able to slide upon the rim C.

Claim—

A traction wheel having a rim, traction lugs projecting outwardly beyond and of greater width than said rim, filler blocks arranged between the traction lugs and of less width than the latter and means for securing said filler blocks in position, said means comprising for each block, a retaining member independent of the block and having side webs spanning the rim and a transverse pin extending between said side webs, for the purpose described.

In testimony whereof I have signed my name to this specification in the presence of two subscribing witnesses.

MARCEL LANDRIN.

Witnesses:
 LEON CHAMBISSEUR,
 LOUIS LAGELOUZE.

Copies of this patent may be obtained for five cents each, by addressing the "Commissioner of Patents, Washington, D. C."